United States Patent
Qin et al.

(10) Patent No.: US 10,533,096 B2
(45) Date of Patent: *Jan. 14, 2020

(54) NON-FLUORINATED WATER-BASED SUPERHYDROPHOBIC COMPOSITIONS

(71) Applicants: KIMBERLY-CLARK WORLDWIDE, INC., Neenah, WI (US); THE BOARD OF TRUSTEES OF THE UNIVERSITY OF ILLINOIS, Urbana, IL (US)

(72) Inventors: Jian Qin, Neenah, WI (US); Donald Eugene Waldroup, Roswell, GA (US); Deborah Joy Calewarts, Neenah, WI (US); Constantine Michael Megaridis, Oak Park, IL (US); Joseph Edward Mates, Chicago, IL (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/551,634

(22) PCT Filed: Feb. 25, 2016

(86) PCT No.: PCT/US2016/019575
§ 371 (c)(1),
(2) Date: Aug. 17, 2017

(87) PCT Pub. No.: WO2016/138272
PCT Pub. Date: Sep. 1, 2016

(65) Prior Publication Data
US 2018/0044541 A1 Feb. 15, 2018

Related U.S. Application Data

(60) Provisional application No. 62/126,077, filed on Feb. 27, 2015.

(51) Int. Cl.
| | | |
|---|---|---|
| *C09D 5/16* | (2006.01) | |
| *C08K 3/013* | (2018.01) | |
| *C08K 3/22* | (2006.01) | |
| *C09D 7/40* | (2018.01) | |
| *C08L 23/06* | (2006.01) | |
| *C08L 23/14* | (2006.01) | |
| *C09D 123/08* | (2006.01) | |
| *C09D 123/14* | (2006.01) | |

(52) U.S. Cl.
CPC ............ *C09D 5/1681* (2013.01); *C08K 3/013* (2018.01); *C08K 3/22* (2013.01); *C08L 23/06* (2013.01); *C08L 23/14* (2013.01); *C09D 7/67* (2018.01); *C09D 123/08* (2013.01); *C09D 123/14* (2013.01); *C08K 2003/2241* (2013.01); *C08L 2201/54* (2013.01)

(58) Field of Classification Search
CPC ........ B01J 2/30; C08K 3/22; C08K 2201/011; C08K 2003/2241; C09D 7/1216; C09D 123/0815; C09D 123/0869; C09D 133/02; C09D 5/00; C09D 7/1266; C09D 7/61; C09D 123/00; C09D 7/12; C09D 7/67; B05D 1/02; B05D 5/00; D21H 19/12; D21H 21/16; C08L 23/0815; C08L 23/0869

See application file for complete search history.

(56) References Cited

U.S. PATENT DOCUMENTS

| | | |
|---|---|---|
| 3,338,992 A | 8/1967 | Kinney |
| 3,341,394 A | 9/1967 | Kinney |
| 3,494,821 A | 2/1970 | Evans |
| 3,502,763 A | 3/1970 | Hartmann |
| 3,542,615 A | 11/1970 | Dobo et al. |
| 3,574,791 A | 4/1971 | Sherman et al. |
| 3,692,618 A | 9/1972 | Dorschner et al. |
| 3,802,817 A | 4/1974 | Matsuki et al. |
| 3,849,241 A | 11/1974 | Butin et al. |

(Continued)

FOREIGN PATENT DOCUMENTS

| | | |
|---|---|---|
| CN | 1830909 A | 9/2006 |
| CN | 101250597 A | 8/2008 |

(Continued)

OTHER PUBLICATIONS

"Differences Between Rutile and Anatase Titanium Dioxide." DifferenceBetween.net. Aug. 4, 2012 < http://www.differencebetween.net/science/chemistry-science/differences-between-rutile-and-anatase-titanium-dioxide/ >.*

Co-pending U.S. Appl. No. 15/551,721, filed Aug. 17, 2017, by Qin et al. for "Non-Fluorinated Water-Based Superhydrophobic Surfaces."

American Society for Testing Materials (ASTM) Designation: F 903-10, "Standard Test Method for Resistance of Materials Used in Protective Clothing to Penetration by Liquids," pp. 1-10, published Feb. 2010.

(Continued)

*Primary Examiner* — Arti Singh-Pandey

(57) ABSTRACT

A superhydrophobic non-fluorinated composition includes a hydrophobic matrix component free of fluorine, a hydrophilic filler particles, wherein the filler particles are metal oxide nanoparticles, and water, wherein the hydrophobic component is in an aqueous dispersion. Also, a superhydrophobic non-fluorinated composition includes a hydrophobic polymer free of fluorine, a titanium dioxide nanoparticle filler particle, and water. In addition, a superhydrophobic non-fluorinated composition includes a hydrophobic polymer free of fluorine, wherein the hydrophobic polymer includes a polyolefin, titanium dioxide nanoparticles as filler, wherein the titanium dioxide nanoparticles are rutile titanium dioxide, anatase titanium dioxide, or a mixture of rutile and anatase titanium dioxide, and water.

17 Claims, 7 Drawing Sheets

(56) References Cited

U.S. PATENT DOCUMENTS

| | | |
|---|---|---|
| 3,855,046 A | 12/1974 | Hansen et al. |
| 4,100,324 A | 7/1978 | Anderson et al. |
| 4,144,370 A | 3/1979 | Boulton |
| 4,340,563 A | 7/1982 | Appel et al. |
| 4,659,609 A | 4/1987 | Lamers et al. |
| 4,833,003 A | 5/1989 | Win et al. |
| 5,048,589 A | 9/1991 | Cook et al. |
| 5,108,820 A | 4/1992 | Kaneko et al. |
| 5,108,827 A | 4/1992 | Gessner |
| 5,284,703 A | 2/1994 | Everhart et al. |
| 5,294,482 A | 3/1994 | Gessner |
| 5,336,552 A | 8/1994 | Strack et al. |
| 5,350,624 A | 9/1994 | Georger et al. |
| 5,382,400 A | 1/1995 | Pike et al. |
| 5,399,412 A | 3/1995 | Sudall et al. |
| 5,468,598 A | 11/1995 | Miller et al. |
| 5,510,001 A | 4/1996 | Hermans et al. |
| 5,539,021 A | 7/1996 | Pate et al. |
| 5,591,309 A | 1/1997 | Rugowski et al. |
| 5,620,779 A | 4/1997 | Levy et al. |
| D390,708 S | 2/1998 | Brown |
| 5,759,926 A | 6/1998 | Pike et al. |
| 5,935,883 A | 8/1999 | Pike |
| 5,962,112 A | 10/1999 | Haynes et al. |
| 6,017,417 A | 1/2000 | Wendt et al. |
| 6,020,419 A | 2/2000 | Bock et al. |
| D428,267 S | 7/2000 | Sayovitz et al. |
| 6,093,665 A | 7/2000 | Sayovitz et al. |
| 6,103,061 A | 8/2000 | Anderson et al. |
| 6,197,404 B1 | 3/2001 | Varona |
| 6,200,669 B1 | 3/2001 | Marmon et al. |
| 6,315,864 B2 | 11/2001 | Anderson et al. |
| 6,432,270 B1 | 8/2002 | Liu et al. |
| 6,955,834 B2 | 10/2005 | Rohrbaugh et al. |
| 7,087,662 B2 | 8/2006 | Ghosh et al. |
| 7,112,621 B2 | 9/2006 | Rohrbaugh et al. |
| 7,196,043 B2 | 3/2007 | Valpey, III et al. |
| 7,732,497 B2 | 6/2010 | Cumberland et al. |
| 7,964,244 B2 | 6/2011 | Oles et al. |
| 8,286,561 B2 | 10/2012 | Driver et al. |
| 8,486,319 B2 | 7/2013 | Victor et al. |
| 8,722,787 B2 | 5/2014 | Romick et al. |
| 9,217,094 B2 | 12/2015 | Megaridis et al. |
| 2002/0045010 A1 | 4/2002 | Rohrbaugh et al. |
| 2004/0077770 A1 | 4/2004 | Zaghib et al. |
| 2005/0100754 A1 | 5/2005 | Moncla et al. |
| 2005/0229327 A1 | 10/2005 | Casella et al. |
| 2006/0172641 A1 | 8/2006 | Hennige et al. |
| 2006/0263516 A1 | 11/2006 | Jones et al. |
| 2007/0027232 A1 | 2/2007 | Walsh, Jr. et al. |
| 2007/0128142 A1 | 6/2007 | Harrison et al. |
| 2007/0135007 A1 | 6/2007 | McCarthy et al. |
| 2007/0264437 A1 | 11/2007 | Zimmermann et al. |
| 2008/0015298 A1 | 1/2008 | Xiong et al. |
| 2008/0102347 A1 | 5/2008 | Blunk |
| 2008/0153963 A1 | 6/2008 | Baran et al. |
| 2008/0221009 A1 | 9/2008 | Kanagasabapathy et al. |
| 2008/0221263 A1 | 9/2008 | Kanagasabapathy et al. |
| 2008/0245273 A1 | 10/2008 | Vyorkka et al. |
| 2008/0250978 A1 | 10/2008 | Baumgart et al. |
| 2008/0268233 A1 | 10/2008 | Lawin et al. |
| 2009/0107524 A1 | 4/2009 | Gross et al. |
| 2009/0227164 A1 | 9/2009 | Broch-Nielsen et al. |
| 2009/0298369 A1 | 12/2009 | Koene et al. |
| 2010/0068434 A1 | 3/2010 | Steele et al. |
| 2010/0069864 A1 | 3/2010 | Berland et al. |
| 2010/0092809 A1 | 4/2010 | Drzal et al. |
| 2010/0184346 A1 | 7/2010 | Qi et al. |
| 2010/0189925 A1 | 7/2010 | Li et al. |
| 2010/0266648 A1 | 10/2010 | Ranade et al. |
| 2011/0021698 A1 | 1/2011 | Vyoerykkae et al. |
| 2011/0207850 A1 | 8/2011 | Kan et al. |
| 2011/0311757 A1 | 12/2011 | Iverson et al. |
| 2012/0149814 A1 | 6/2012 | Li et al. |
| 2013/0029551 A1 | 1/2013 | Qin et al. |
| 2014/0079932 A1 | 3/2014 | Aksay et al. |
| 2014/0174619 A1 | 6/2014 | Hinque |
| 2014/0323002 A1 | 10/2014 | Qin et al. |
| 2014/0323633 A1 | 10/2014 | Megaridis et al. |
| 2018/0030282 A1* | 2/2018 | Qin .................. C09D 5/00 |

FOREIGN PATENT DOCUMENTS

| | | |
|---|---|---|
| CN | 101434802 A | 5/2009 |
| CN | 101845242 A | 9/2010 |
| EP | 2423269 A1 | 2/2012 |
| JP | 11-181339 A | 7/1999 |
| KR | 10-0823895 B1 | 4/2008 |
| KR | 10-2011-0059173 A | 6/2011 |
| KR | 10-2013-0029972 A | 3/2013 |
| WO | WO 1999/009070 A1 | 2/1999 |
| WO | WO 2009/118552 A1 | 10/2009 |
| WO | WO 2009/121312 A1 | 10/2009 |
| WO | WO 2010/002859 A2 | 1/2010 |
| WO | WO 2010/073623 A1 | 7/2010 |
| WO | WO 2012/156172 A1 | 11/2012 |
| WO | WO 2014/097309 A1 | 6/2014 |

OTHER PUBLICATIONS

Bhushan, Bharat and Eun Kyu Her, "Fabrication of Superhydrophobic Surfaces with High and Low Adhesion Inspired from Rose Petal," Langmuir, vol. 26, No. 11, 2010, pp. 8207-8217.

Schutzius, Thomas M. et al., "Water-Based, Nonfluorinated Dispersions for Environmentally Benign, Large-Area, Superhydrophobic Coatings," ACS Applied Materials & Interfaces, vol. 5, No. 24, Dec. 2, 2013, pp. 13419-13425.

Shunjin, Peng, "Preparation of Aqueous Fluoropolymer Latexes and Their Application as Finishing Agents with Water-and-Oil Repellency" Chinainfo, Aug. 7, 2007, pp. 42, 44, 47 and 48.

* cited by examiner

TiO₂ - ANATASE

TiO₂ - ANATASE

TiO₂ - RUTILE

TiO₂ - RUTILE

TiO₂ - MIX

TiO₂ - MIX

NON-FLUORINATED WATER-BASED SUPERHYDROPHOBIC COMPOSITIONS

BACKGROUND

The present disclosure relates to surfaces that exhibit superhydrophobic properties when treated with a fluorine-free composition applied with a water-based, non-organic solvent.

A superhydrophobic surface exhibits a sessile water contact angle of greater than 150°. If, additionally, the surface exhibits a water droplet roll-off (sliding) angle of less than 10°, the surface is deemed to be "self-cleaning." In nature, lotus leaves exhibit such properties (so-called lotus effect). Most man-made materials such as fabrics, nonwovens, cellulose tissues, polymer films, etc., do not have surfaces with such properties. Currently, there are several methods to modify a non-superhydrophobic surface to achieve the lotus effect. One method is to graft hydrophobic polymer(s) (using a monomer, co-monomers, etc.) onto every exposed surface of a non-superhydrophobic material. Such a method makes the material superhydrophobic throughout the thickness of the material, which might not be desired in most cases. It is also not cost effective, cannot be used for a continuous production, and can lead to undesirable environment issues.

The development and implementation of water-based, non-fluorinated formulations for bio-inspired superhydrophobic surface treatments can greatly reduce the adverse environmental impact typically associated with their synthesis. Over the past several decades, many approaches to these superhydrophobic surfaces have been developed that commonly require harsh organic solvents, complex processing methods, and/or environmentally undesirable fluorinated chemistry. In addition, many of the demonstrated methods are not relevant in practice on large scales in commercial application, not only for their negative consequences to the environment, but also the inability to economically prepare large-area fluid repellent surfaces at sufficiently low-cost. Imparting liquid repellency via large-area approaches, such as spray-casting or size press coating, have been shown to be viable for low-cost and substrate-independent fluid management. Previously, a likewise water-based and non-fluorinated superhydrophobic formulation was presented achieving nanometer-scale roughness via exfoliated graphite nanoplatelets (GNP, a.k.a. multilayer graphene); unfortunately, this formulation had an opacity and dark color, limiting its versatility in many commercial applications. More importantly, this approach required pH adjustment to improve suspension stability.

A standard approach is to coat a specially-formulated liquid dispersion onto a surface. Upon subsequent drying, a nano-structured superhydrophobic film forms. To use such an approach, the deposited film must exhibit a chemical and physical morphology characteristic of superhydrophobic surfaces. First, the formulation requires at least one low-surface energy (i.e., hydrophobic) component, and second, the treated surface has to have a rough surface texture, preferably extending over several length-scales characteristic of micro- and/or nano-roughness. Although various formulated dispersions capable of achieving a superhydrophobic surface exist, rarely are they purely water-based and they generally contain harmful fluorinated compounds to reduce surface energy.

Low-cost, large-area superhydrophobic coating treatments are of great value to many applications requiring a passive means for attaining efficient liquid repellency. While many applications are envisioned, only few are realizable due to either the high-cost or low-durability of such treatments. Recently, spray deposition of polymer-particle dispersions has been demonstrated as an excellent means for producing low-cost, large-area, durable, superhydrophobic composite coatings/films; however, the dispersions used for spray deposition of superhydrophobic coatings generally contain harsh or volatile solvents. Solvents are required for wet processing of polymers, as well as for dispersing hydrophobic nanoparticles, thus inhibiting scalability due to the increased cost in chemical handling and safety concerns. This problem can be overcome by replacing solvents with water, but this situation is paradoxical: producing a highly water-repellent coating from an aqueous dispersion.

Also, such coatings usually contain fluoropolymers. A low-surface energy fluoropolymer (e.g., fluoroacrylic copolymers, poly(tetrafluoroethylene), etc.) is typically incorporated into the formulation to achieve liquid repellency. However, concerns over their bio-persistence have provided an impetus for eliminating these chemicals. The problems with the byproducts of fluoropolymer degradation, e.g. long-chain perfluorinated acids (PFAs) that have a documented ability to bioaccumulate, as well as the potential adverse effects PFA in maternal concentrations can have on human offspring, have led to a shift in the manufacture and usage of fluoropolymers. One common PFA of particular concern is perfluorooctanoic acid (PFOA). In 2006, the EPA introduced its PFOA (perfluorooctanoic acid) Stewardship Program and invited eight major fluoropolymer and telomer manufacturers to commit to eliminating precursor chemicals that can break down into PFOA; in one case, DuPont has since introduced so-called short-chain chemistry, whereby the length of perfluorinated chains within polymers are kept below a threshold in order to avoid degradation into PFOA. In other applications, usage of fluoropolymers in products that come in sustained contact with the human body or in disposable items intended for landfilling after consumption must be minimized.

SUMMARY

Using a waterborne, wax-based approach eliminates the need for fluorinated compounds, and incorporating titanium oxide ($TiO_2$) nanoparticles has made possible a translucent-white superhydrophobic surface treatment that does not require subsequent pH-modification. This novel, environmentally-friendly composite is herein characterized as having potential in numerous fluid management applications by virtue of its simplicity, efficiency, and versatility.

For a multitude of safety, health, economic, and environmental issues, it is important both that the dispersion be fully aqueous-based when regarding commercial scale production, as this will decrease concerns associated with the use of organic solvents and fluoropolymers.

The presence of a translucent-white, water-based, and entirely fluorine-free superhydrophobic formulation capable of large-area surface modification has been lacking in the literature and in commercial application, and for this reason has been developed and herein been characterized.

The present disclosure relates to a superhydrophobic non-fluorinated composition including a hydrophobic matrix component free of fluorine, a hydrophilic filler particles, wherein the filler particles are metal oxide nanoparticles, and water, wherein the hydrophobic component is in an aqueous dispersion.

The present disclosure also relates to a superhydrophobic non-fluorinated composition including a hydrophobic polymer free of fluorine, a titanium dioxide nanoparticle filler particle, and water.

The present disclosure also relates to a superhydrophobic non-fluorinated composition including a hydrophobic polymer free of fluorine, wherein the hydrophobic polymer includes a polyolefin, titanium dioxide nanoparticles as filler, wherein the titanium dioxide nanoparticles are rutile titanium dioxide, anatase titanium dioxide, or a mixture of rutile and anatase titanium dioxide, and water.

BRIEF DESCRIPTION OF THE FIGURES

The foregoing and other features and aspects of the present disclosure and the manner of attaining them will become more apparent, and the disclosure itself will be better understood by reference to the following description, appended claims and accompanying drawings, where:

Figure 1A:
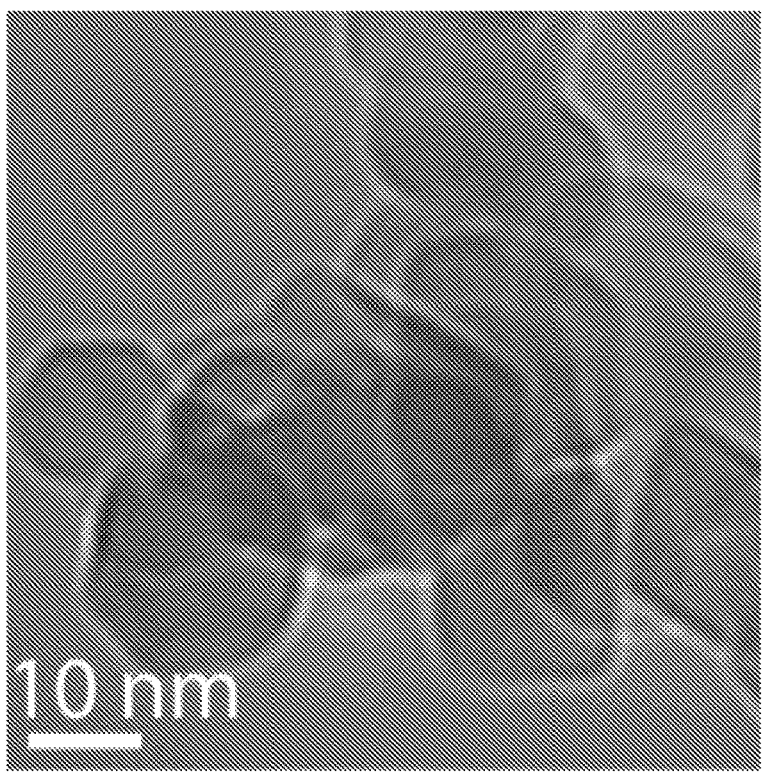
FIG. 1A illustrates a high magnification transmission electron microscopy (TEM) image of 21 nm mixed-phase $TiO_2$ (rutile and anatase)
Figure 1B:
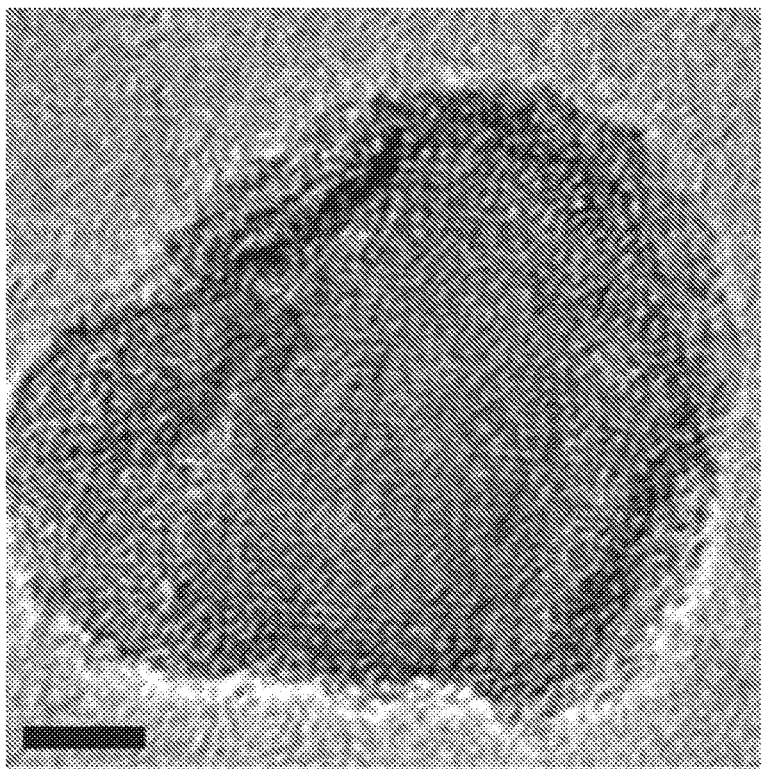
FIG. 1B illustrates a high magnification TEM image of anatase $TiO_2$ with a scale bar denoting 10 nm.
Figure 2:
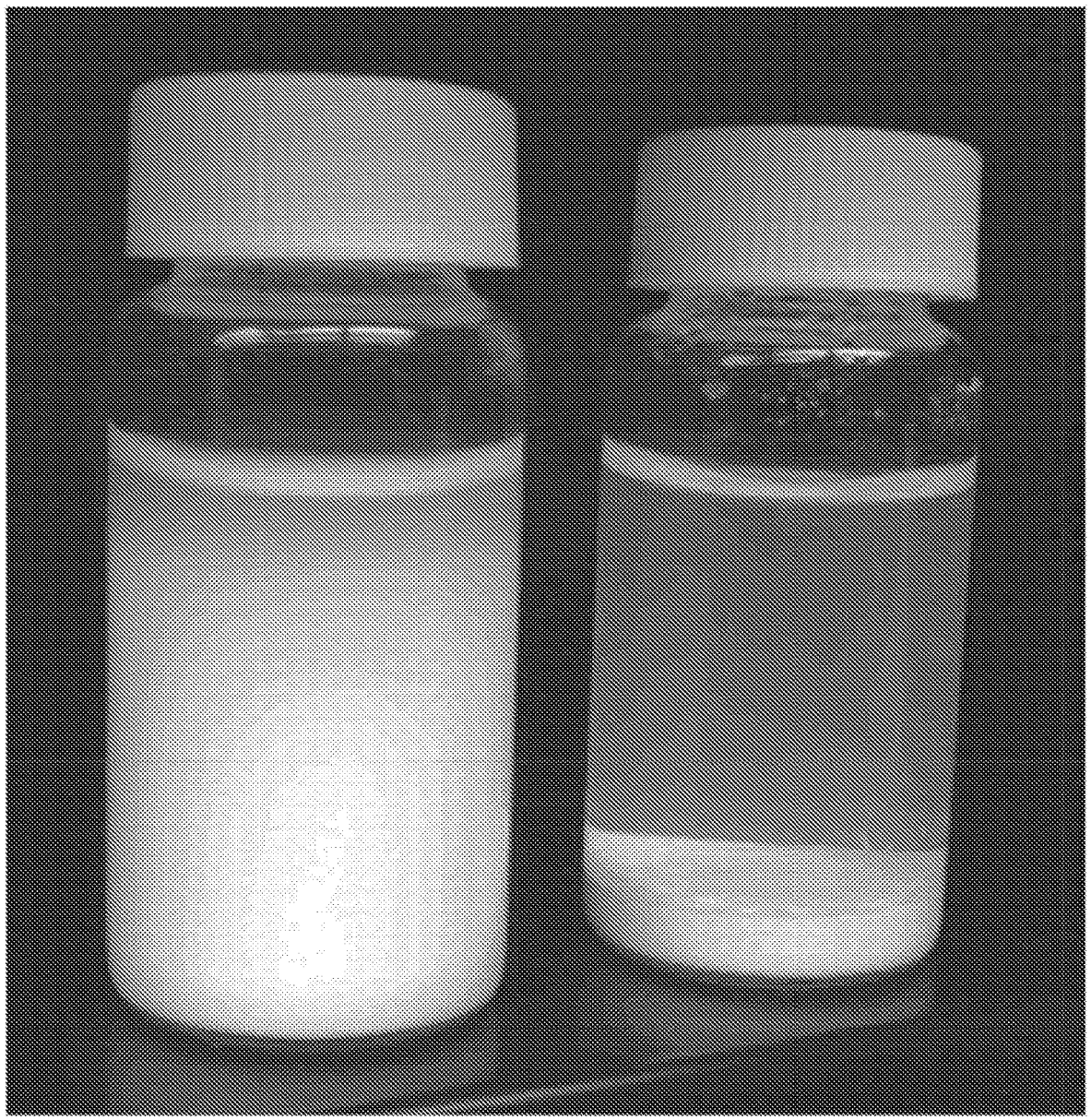
FIG. 2 illustrates 20 ml vials of sonicated $TiO_2$ particles in water after one month of storage: the left vial contains mixed-phase $TiO_2$ with 21 nm average particle size, while the right vial contains primarily anatase-phase $TiO_2$ with 25 nm average particle size.
Figure 3A:
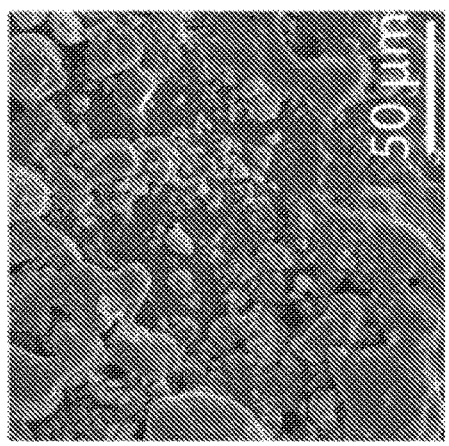
FIG. 3A illustrates a lower magnification scanning electron microscopy (SEM) image of a $TiO_2$ composite containing anatase $TiO_2$.
Figure 3B:
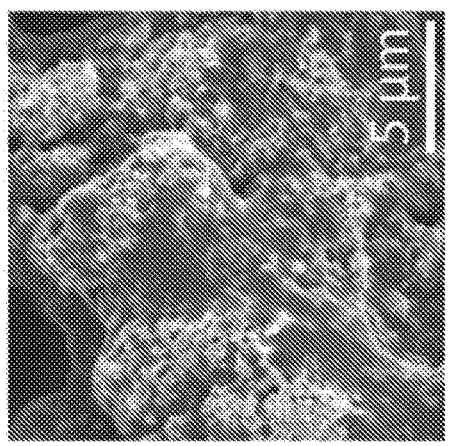
FIG. 3B illustrates a higher magnification SEM image of a $TiO_2$ composite containing anatase $TiO_2$.
Figure 3C:
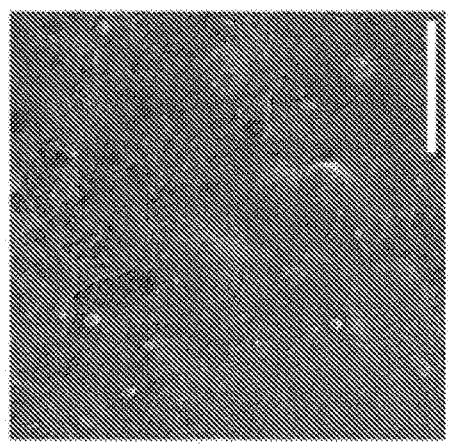
FIG. 3C illustrates a lower magnification SEM image of a $TiO_2$ composite using mixed-phase $TiO_2$ with 21 nm average particle size.
Figure 3D:
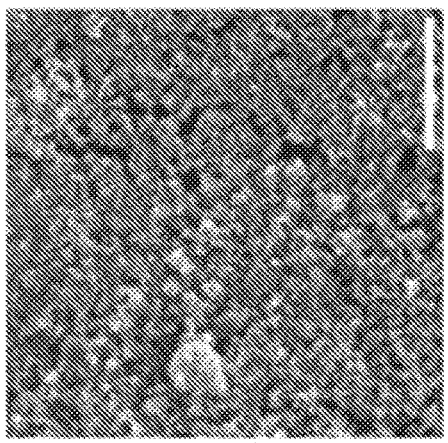
FIG. 3D illustrates a higher magnification SEM image of a $TiO_2$ composite using mixed-phase $TiO_2$ with 21 nm average particle size.
Figure 3E:
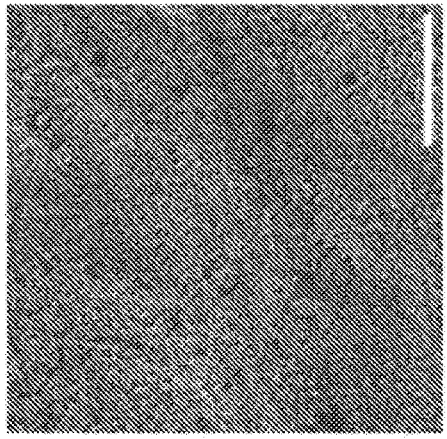
FIG. 3E illustrates a lower magnification SEM image of a $TiO_2$ composite using a mixture of rutile and anatase $TiO_2$ with 100 nm average particle size.
Figure 3F:
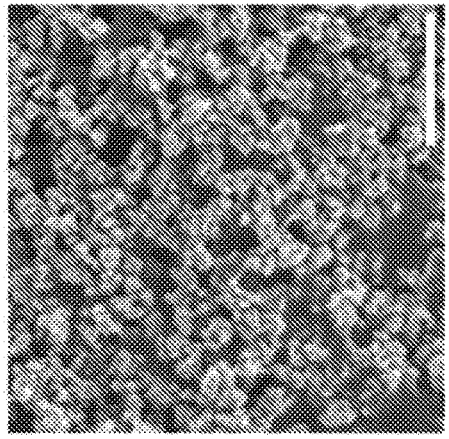
FIG. 3F illustrates a higher magnification SEM image of a $TiO_2$ composite using a mixture of rutile and anatase $TiO_2$ with 100 nm average particle size.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

All percentages are by weight of the total solid composition unless specifically stated otherwise. All ratios are weight ratios unless specifically stated otherwise.

The term "superhydrophobic" refers to the property of a surface to repel water very effectively. This property is quantified by a water contact angle exceeding 150°.

The term "hydrophobic," as used herein, refers to the property of a surface to repel water with a water contact angle from about 90° to about 120°.

The term "hydrophilic," as used herein, refers to surfaces with water contact angles well below 90°.

The term "self-cleaning," as used herein, refers to the property to repel water with the water roll-off angle on a tilting surface being below 10°.

The term "mixed-phase," as used herein, refers to a mixture of rutile and anatase $TiO_2$ nanoparticles.

As used herein, the term "nonwoven web" or "nonwoven fabric" means a web having a structure of individual fibers or threads that are interlaid, but not in an identifiable manner as in a knitted web. Nonwoven webs have been formed from many processes, such as, for example, meltblowing processes, spunbonding processes, air-laying processes, coforming processes and bonded carded web processes. The basis weight of nonwoven webs is usually expressed in ounces of material per square yard (osy) or grams per square meter (gsm) and the fiber diameters are usually expressed in microns, or in the case of staple fibers, denier. It is noted that to convert from osy to gsm, osy must be multiplied by 33.91.

As used herein the term "spunbond fibers" refers to small diameter fibers of molecularly oriented polymeric material. Spunbond fibers can be formed by extruding molten thermoplastic material as fibers from a plurality of fine, usually circular capillaries of a spinneret with the diameter of the extruded fibers then being rapidly reduced as in, for example, U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,542,615 to Dobo et al, and U.S. Pat. No. 5,382,400 to Pike et al. Spunbond fibers are generally not tacky when they are deposited onto a collecting surface and are generally continuous. Spunbond fibers are often about 10 microns or greater in diameter. However, fine fiber spunbond webs (having an average fiber diameter less than about 10 microns) can be achieved by various methods including, but not limited to, those described in commonly assigned U.S. Pat. No. 6,200,669 to Marmon et al. and U.S. Pat. No. 5,759,926 to Pike et al.

Meltblown nonwoven webs are prepared from meltblown fibers. As used herein the term "meltblown fibers" means fibers formed by extruding a molten thermoplastic material through a plurality of fine, usually circular, die capillaries as molten threads or filaments into converging high velocity, usually hot, gas (e.g. air) streams that attenuate the filaments of molten thermoplastic material to reduce their diameter, which can be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin. Meltblown fibers are microfibers that can be continuous or discontinuous, are generally smaller than 10 microns in average diameter (using a sample size of at least 10), and are generally tacky when deposited onto a collecting surface.

As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

As used herein, the term "multicomponent fibers" refers to fibers or filaments that have been formed from at least two polymers extruded from separate extruders but spun together to form such fibers. Multicomponent fibers are also sometimes referred to as "conjugate" or "bicomponent" fibers or filaments. The term "bicomponent" means that there are two polymeric components making up the fibers. The polymers are usually different from each other, although conjugate fibers can be prepared from the same polymer, if the polymer in each state is different from the other in some physical property, such as, for example, melting point, glass transition temperature or the softening point. In all cases, the polymers are arranged in purposefully positioned distinct zones across the cross-section of the multicomponent fibers or filaments and extend continuously along the length of the multicomponent fibers or filaments. The configuration of such a multicomponent fiber can be, for example, a sheath/core arrangement, wherein one polymer is surrounded by another, a side-by-side arrangement, a pie arrangement or an "islands-in-the-sea" arrangement. Multicomponent fibers are taught in U.S. Pat. No. 5,108,820 to Kaneko et al.; U.S. Pat. No. 5,336,552 to Strack et al.; and U.S. Pat. No. 5,382,400 to Pike et al. For two component fibers or filaments, the polymers can be present in ratios of 75/25, 50/50, 25/75 or any other desired ratios.

As used herein, the term "multiconstituent fibers" refers to fibers that have been formed from at least two polymers extruded from the same extruder as a blend or mixture. Multiconstituent fibers do not have the various polymer components arranged in relatively constantly positioned distinct zones across the cross-sectional area of the fiber and the various polymers are usually not continuous along the entire length of the fiber, instead usually forming fibrils or protofibrils that start and end at random. Fibers of this general type are discussed in, for example, U.S. Pat. Nos. 5,108,827 and 5,294,482 to Gessner.

As used herein, the term "substantially continuous fibers" is intended to mean fibers that have a length that is greater than the length of staple fibers. The term is intended to include fibers that are continuous, such as spunbond fibers, and fibers that are not continuous, but have a defined length greater than about 150 millimeters.

As used herein, the term "staple fibers" means fibers that have a fiber length generally in the range of about 0.5 to about 150 millimeters. Staple fibers can be cellulosic fibers or non-cellulosic fibers. Some examples of suitable non-cellulosic fibers that can be used include, but are not limited to, polyolefin fibers, polyester fibers, nylon fibers, polyvinyl acetate fibers, and mixtures thereof. Cellulosic staple fibers include for example, pulp, thermomechanical pulp, synthetic cellulosic fibers, modified cellulosic fibers, and the like. Cellulosic fibers can be obtained from secondary or recycled sources. Some examples of suitable cellulosic fiber sources include virgin wood fibers, such as thermomechanical, bleached and unbleached softwood and hardwood pulps. Secondary or recycled cellulosic fibers can be obtained from office waste, newsprint, brown paper stock, paperboard scrap, etc., can also be used. Further, vegetable fibers, such as abaca, flax, milkweed, cotton, modified cotton, cotton linters, can also be used as the cellulosic fibers. In addition, synthetic cellulosic fibers such as, for example, rayon and viscose rayon can be used. Modified cellulosic fibers are generally composed of derivatives of cellulose formed by substitution of appropriate radicals (e.g., carboxyl, alkyl, acetate, nitrate, etc.) for hydroxyl groups along the carbon chain.

As used herein, the term "pulp" refers to fibers from natural sources, such as woody and non-woody plants. Woody plants include, for example, deciduous and coniferous trees. Non-woody plants include, for example, cotton, flax, esparto grass, milkweed, straw, jute, hemp, and bagasse.

As used herein, "tissue products" are meant to include facial tissue, bath tissue, towels, hanks, napkins, and the like. The present disclosure is useful with tissue products and tissue paper in general, including but not limited to conventionally felt-pressed tissue paper, high bulk pattern densified tissue paper, and high bulk, uncompacted tissue paper.

Current formulations used to prepare a substrate to demonstrate superhydrophobicity require harmful fluorinated polymers in conjunction with solvents that include harmful volatile organic compounds (VOCs). The present disclosure solves these problems for these applications by using more preferable polymers, such as polyolefins (e.g., polyethylene (PE)), and water-borne solvents to minimize the use of harmful VOCs, a common, non-trivial problem with coatings aiming to achieve superhydrophobicity upon deposition. The present disclosure builds on the work described in co-pending U.S. patent application Ser. Nos. 13/873,614 and 13/873,663, which are incorporated herein by reference to the extent they do not conflict herewith.

The present disclosure describes a water-based, non-fluorinated dispersion for the formation of superhydrophobic composite coatings from spray or from any other suitable method. Spray deposition of polymer composite coatings is described for illustrative purposes only and has been demonstrated as a low-cost, large area process for modifying the wettability (e.g., superhydrophobicity, superoleophobicity), electrical conductivity, and EMI shielding capabilities of surfaces. Any other suitable method of delivering a coating can be used herein.

A superhydrophobic surface of the present disclosure can be produced on a substrate by treating the substrate with a non-fluorinated composition including a hydrophobic component free of fluorine, a filler particle, and water. The composition can also include a stabilizing compound. The hydrophobic component is preferably in an aqueous dispersion. As a result, the composition can be free of volatile organic compounds (VOCs).

The study of functional nanoparticle-polymer composites has been aided in large part by the advancement in synthesis methods for polymers as well as greater control over nanoparticle dimensions and purities. These composites have been used for a wide range of applications, such as enhanced heat transfer, low electrical resistance, and radiation absorption. For liquid-repellent functionality, specifically to water, the surface requires low surface energies and a suitable degree of roughness to reduce the liquid-to-solid interfacial contact area, thus increasing the contact angle of water droplets used as a measure of surface wettability. The wettability of a smooth un-textured surface in an air environment is determined by the free surface energies of the liquid and solid being introduced; whether the surface is hydrophobic or hydrophilic, the interaction with water is tunable via the surface roughness imparted by the addition of nanomaterials. A high-degree of surface roughness modifies the intrinsic wettability of the surface into two extreme cases, referred to as either superhydrophobic or superhydrophilic having contact angles to water of greater than 150° or less than 10°, respectively. The polymer has the direct role in an applied composite of determining the affinity of liquid(s) to a given surface, as well as forming the matrix for any ensconced nanomaterials within.

In practice until recently, the fabrication of super-repellent composites requiring polymers with sufficiently low surface energies (i.e., for repelling water, y<<72 mN/m) demanded the use of harsh solvents for wet-processing, thus hindering the development of entirely water-based systems. Fluorine-free and water-compatible polymer systems capable of delivering low surface energy have been the primary challenge for the development of truly environmentally-benign superhydrophobic coatings. A low surface energy, waterborne fluoropolymer dispersion (DuPont Capstone ST-100) was used in a water-based superhydrophobic spray, where the correlation between contact angle and hydrostatic resistance was studied, but again, the presence of fluorinated compounds in the composite still posed environmental concerns. At one point the EPA initiated a reduction in the manufacture of many dangerous fluoropolymer compounds; such compounds have a high risk of breaking down into perfluorooctanoic acids (PFOA) and can have an extremely adverse environmental impact. PFOA, a known cause of birth defects, can enter into ground water, polluting reservoirs and aquatic wild-life, eventually being ingested by humans where it can accumulate to hazardous levels. Although short-chain fluoropolymers made in response to the EPA initiative, such as DuPont's Capstone ST-100, are available and pose less environmental risk; eliminating the necessity of fluorine altogether for super-repellency has been a primary goal of this work; it is hoped that one day, such fluorinated composites can be made obsolete, being replaced by more environmentally-conscious, so-called 'green' alternatives.

Choosing particles having nano-scale dimensions allows for fine control over surface roughness and a greater reduction in the liquid-to-solid interfacial contact area; for hydrophobic, or low-surface energy surfaces, this translates into an increased resistance to fluid wetting by allowing the solid surface to retain pockets of vapor that limit liquid/solid contact. Many superhydrophobic surfaces fabricated in the literature have utilized hydrophobic particle fillers, necessitating the use of non-aqueous suspensions or other additives. Although these hydrophobic particles aided in generating the repellent roughness, they are not viable in a water-based system without the use of charge-stabilization or surfactants. The hydrophilic nanoparticle $TiO_2$ is demonstrated to supply an adequate amount of surface roughness, and is compatible with a waterborne polyolefin polymer wax blend; the polymer acts to conceal the hydrophilicity of suspended $TiO_2$ particles when dispersed, thus sheathing the nanoparticles in a weakly hydrophobic shell that is maintained once the final composite film has been applied and residual water is removed. Using nanoparticles of extremely small dimensions (<25 nm), a surface roughness is achieved propelling the contact angles of the final composite upwards into the superhydrophobic regime. In addition, $TiO_2$ has been shown to be a non-toxic additive to food, skin lotions, and paint pigments, thereby further strengthening the claim of reduced impact, environmentally or otherwise, from the composite constituents.

The hydrophobic component is a hydrophobic polymer that is dispersible in water to form the basic elements of the superhydrophobic properties of the present disclosure. The hydrophobic component can be a polymer, a nanoparticle, any other suitable material, or any combination of these. For example, the hydrophobic component can be a polyolefin. The hydrophobic component can also be a co-polymer of olefin and acrylic acid, or a mixture of a polyolefin and a co-polymer of olefin and acrylic acid.

The solid components of the present disclosure (i.e., polymer, nano-structured particles) can be present in an amount from about 1.0% to about 3.0%, by weight of the solution. Such an amount is suitable for spray applications, where higher concentrations of either polymer and/or nanoparticles in the dispersion can lead to either viscoelastic behavior, resulting in either clogging of the spray nozzle or incomplete atomization and fiber formation, or dramatic increases in dispersion viscosity and thus nozzle clogging. When a different surface coating technology is used, e.g. dipping, the range might be different. For example, if a size press coating is used, use of a higher percentage of the solid components is preferred. The range can be in an amount from about 1.0% to about 10%. It should be noted that this range is not fixed and that it is a function of the materials being utilized and the procedure used to prepare the dispersion. When a higher amount of the polymer is used, the surface structure is less desirable as it lacks the proper texture to be superhydrophobic. When a lower amount of the polymer is used, the binding is less desirable, as the coating behaves more so as a removable powder coating.

Additionally, it is desired that the polymer-to-particle weight ratio in the coating be about 4:1 or about 3:2, or about 1:1, or about 2:3, or about 1:4 in order to optimize the balance between low surface energy and desirable surface texture.

The composition of the present disclosure eliminates the use of an organic solvent by carefully selecting the appropriate combination of elements to impart the superhydrophobic characteristics. Preferably, the non-organic solvent is water. Any type of water can be used; however, demineralized or distilled water can be opted for use during the manufacturing process for enhanced capabilities and a reduction in possible contaminants that could alter performance of the coating. The use of water helps to reduce the safety concerns associated with making commercial scale formulations including organic solvents. For example, due to the high volatility and flammability of most organic solvents, eliminating such use in the composition reduces production safety hazards.

Additionally, production costs can be lowered with the elimination of ventilation and fire prevention equipment necessitated by organic solvents. Raw material costs can be reduced in addition to the transportation of such materials as an added advantage to using the non-organic solvent formulation to arrive at the present disclosure.

Additionally, because water is considered a natural resource, surfaces treated with a solvent including water as its base can be considered healthier and better for the environment. The formulation used to treat the surface of the present disclosure includes greater than about 95%, greater than about 98%, or about 99% water, by weight of the dispersion composition.

The composition of the present disclosure includes one or more filler particles. It is preferred that such filler material, if used, be hydrophilic. The filler material can include metal oxide nanoparticles and high-aspect ratio nanomaterials, such as exfoliated graphite, graphene, etc. In particular aspects, the metal oxide nanoparticle can be rutile titanium dioxide, anatase titanium dioxide, or a mixture of both rutile and anatase titanium dioxide In some aspects of the present disclosure, the composition includes a stabilizing compound. Hydrophobic components such as polymers and nanoparticles can be stabilized in water by using chemicals that include acid functional groups (e.g., acrylic acid, carboxylic acid), and that can become ionized in water under proper pH control (pH>7). The stabilizing compound can be KOH, $NH_3$(aq), any other suitable material, or any combination of these. The use of such polymers as hydrophobic components is possible by introducing pendant carboxylic acid functional groups that can be charge-stabilized by increasing the pH of the dispersing medium (water); in short, acid functional groups form negative carboxylate ions, thus creating charge repulsion and ultimately stabilization. Carboxylic acid groups also act to promote adhesion with polar surfaces.

Once spray-deposited on a substrate with the aqueous component allowed to evaporate or removed through drying or thermal curing, the components become insoluble in water, thus promoting water repellency. Such coatings can find a wide range of applications due to their benign processing nature, as well as the wide variety of substrates on which they can be deposited.

The particular example described herein is an all-water-based, non-fluorinated superhydrophobic surface treatment from a sprayable polyethylene copolymer and titanium dioxide dispersion. Such an approach to water-repellent coatings is expected to find wide application within consumer products aiming to achieve simple, low-cost, large-area, environmentally-benign superhydrophobic treatments. It is emphasized that $TiO_2$ is employed for its dispersibility in water and compatibility with polyolefin chemistry, but that any high-aspect ratio filler with similar adsorptive chemistry can also be used.

The present disclosure relates to a surface of a substrate, or the substrate itself, exhibiting superhydrophobic characteristics when treated with a formulation including a hydrophobic component, a filler particle, and water. The superhydrophobicity can be applied either over the entire surface, patterned throughout or on the substrate material, and/or directly penetrated through the z-directional thickness of the substrate material.

In some aspects of the present disclosure, the substrate that is treated is a nonwoven web. In other aspects, the substrate is a tissue product.

The substrate of the present disclosure can be treated such that it is superhydrophobic throughout the z-directional thickness of the material and is controlled in such a way that only certain areas of the material are superhydrophobic. Such treatment can be designed to control spatial wettability of the material thereby directing wetting and liquid penetration of the material; such designs can be utilized in controlling liquid transport and flow rectification.

Suitable substrates of the present disclosure can include a nonwoven fabric, woven fabric, knit fabric, or laminates of these materials. The substrate can also be a tissue or towel, as described herein. Materials and processes suitable for forming such substrate are generally well known to those skilled in the art. For instance, some examples of nonwoven fabrics that can be used in the present disclosure include, but are not limited to, spunbonded webs, meltblown webs, bonded carded webs, air-laid webs, coform webs, spunlace nonwoven webs, hydraulically entangled webs, and the like. In each case, at least one of the fibers used to prepare the nonwoven fabric is a thermoplastic material containing fiber. In addition, nonwoven fabrics can be a combination of thermoplastic fibers and natural fibers, such as, for example, cellulosic fibers (softwood pulp, hardwood pulp, thermomechanical pulp, etc.). Generally, from the standpoint of cost and desired properties, the substrate of the present disclosure is a nonwoven fabric.

If desired, the nonwoven fabric can also be bonded using techniques well known in the art to improve the durability, strength, hand, aesthetics, texture, and/or other properties of the fabric. For instance, the nonwoven fabric can be thermally (e.g., pattern bonded, through-air dried), ultrasonically, adhesively and/or mechanically (e.g. needled) bonded. For instance, various pattern bonding techniques are described in U.S. Pat. No. 3,855,046 to Hansen; U.S. Pat. No. 5,620,779 to Levy, et al.; U.S. Pat. No. 5,962,112 to Haynes, et al.; U.S. Pat. No. 6,093,665 to Sayovitz, et al.; U.S. Design Pat. No. 428,267 to Romano, et al.; and U.S. Design Pat. No. 390,708 to Brown.

The nonwoven fabric can be bonded by continuous seams or patterns. As additional examples, the nonwoven fabric can be bonded along the periphery of the sheet or simply across the width or cross-direction (CD) of the web adjacent the edges. Other bond techniques, such as a combination of thermal bonding and latex impregnation, can also be used. Alternatively and/or additionally, a resin, latex or adhesive can be applied to the nonwoven fabric by, for example, spraying or printing, and dried to provide the desired bonding. Still other suitable bonding techniques can be described in U.S. Pat. No. 5,284,703 to Everhart, et al., U.S. Pat. No. 6,103,061 to Anderson, et al., and U.S. Pat. No. 6,197,404 to Varona.

In another aspect, the substrate of the present disclosure is formed from a spunbonded web containing monocomponent and/or multicomponent fibers. Multicomponent fibers are fibers that have been formed from at least two polymer components. Such fibers are usually extruded from separate extruders but spun together to form one fiber. The polymers of the respective components are usually different from each other, although multicomponent fibers can include separate components of similar or identical polymeric materials. The individual components are typically arranged in distinct zones across the cross-section of the fiber and extend substantially along the entire length of the fiber. The configuration of such fibers can be, for example, a side-by-side arrangement, a pie arrangement, or any other arrangement.

When utilized, multicomponent fibers can also be splittable. In fabricating multicomponent fibers that are splittable, the individual segments that collectively form the unitary multicomponent fiber are contiguous along the longitudinal direction of the multicomponent fiber in a manner such that one or more segments form part of the outer surface of the unitary multicomponent fiber. In other words, one or more segments are exposed along the outer perimeter of the multicomponent fiber. For example, splittable multicomponent fibers and methods for making such fibers are described in U.S. Pat. No. 5,935,883 to Pike and U.S. Pat. No. 6,200,669 to Marmon, et al.

The substrate of the present disclosure can also contain a coform material. The term "coform material" generally refers to composite materials including a mixture or stabilized matrix of thermoplastic fibers and a second non-thermoplastic material. As an example, coform materials can be made by a process in which at least one meltblown die head is arranged near a chute through which other materials are added to the web while it is forming. Such other materials can include, but are not limited to, fibrous organic materials, such as woody or non-woody pulp such as cotton, rayon, recycled paper, pulp fluff and also superabsorbent particles, inorganic absorbent materials, treated polymeric staple fibers and the like. Some examples of such coform materials are disclosed in U.S. Pat. No. 4,100,324 to Anderson, et al.; U.S. Pat. No. 5,284,703 to Everhart, et al.; and U.S. Pat. No. 5,350,624 to Georger, et al.

Additionally, the substrate can also be formed from a material that is imparted with texture on one or more surfaces. For instances, in some aspects, the substrate can be formed from a dual-textured spunbond or meltblown material, such as described in U.S. Pat. No. 4,659,609 to Lamers, et al. and U.S. Pat. No. 4,833,003 to Win, et al.

In one particular aspect of the present disclosure, the substrate is formed from a hydroentangled nonwoven fabric. Hydroentangling processes and hydroentangled composite webs containing various combinations of different fibers are known in the art. A typical hydroentangling process utilizes high pressure jet streams of water to entangle fibers and/or filaments to form a highly entangled consolidated fibrous structure, e.g., a nonwoven fabric. Hydroentangled nonwoven fabrics of staple length fibers and continuous filaments are disclosed, for example, in U.S. Pat. No. 3,494,821 to Evans and U.S. Pat. No. 4,144,370 to Boulton. Hydroentangled composite nonwoven fabrics of a continuous filament nonwoven web and a pulp layer are disclosed, for example, in U.S. Pat. No. 5,284,703 to Everhart, et al. and U.S. Pat. No. 6,315,864 to Anderson, et al.

Of these nonwoven fabrics, hydroentangled nonwoven webs with staple fibers entangled with thermoplastic fibers is especially suited as the substrate. In one particular example of a hydroentangled nonwoven web, the staple fibers are hydraulically entangled with substantially continuous thermoplastic fibers. The staple can be cellulosic staple fiber, non-cellulosic stable fibers or a mixture thereof. Suitable non-cellulosic staple fibers includes thermoplastic staple fibers, such as polyolefin staple fibers, polyester staple fibers, nylon staple fibers, polyvinyl acetate staple fibers, and the like or mixtures thereof. Suitable cellulosic staple fibers include for example, pulp, thermomechanical pulp, synthetic cellulosic fibers, modified cellulosic fibers, and the like. Cellulosic fibers can be obtained from secondary or recycled sources. Some examples of suitable cellulosic fiber sources include virgin wood fibers, such as thermomechanical, bleached and unbleached softwood and hardwood pulps. Secondary or recycled cellulosic fibers obtained from office waste, newsprint, brown paper stock, paperboard scrap, etc., can also be used. Further, vegetable fibers, such as abaca, flax, milkweed, cotton, modified cotton, cotton linters, can also be used as the cellulosic fibers. In addition, synthetic cellulosic fibers such as, for example, rayon and viscose rayon can be used. Modified cellulosic fibers are generally composed of derivatives of cellulose formed by substitution of appropriate radicals (e.g., carboxyl, alkyl, acetate, nitrate, etc.) for hydroxyl groups along the carbon chain.

One particularly suitable hydroentangled nonwoven web is a nonwoven web composite of polypropylene spunbond fibers, which are substantially continuous fibers, having pulp fibers hydraulically entangled with the spunbond fibers. Another particularly suitable hydroentangled nonwoven web is a nonwoven web composite of polypropylene spunbond fibers having a mixture of cellulosic and non-cellulosic staple fibers hydraulically entangled with the spunbond fibers.

The substrate of the present disclosure can be prepared solely from thermoplastic fibers or can contain both thermoplastic fibers and non-thermoplastic fibers. Generally, when the substrate contains both thermoplastic fibers and non-thermoplastic fibers, the thermoplastic fibers make up from about 10% to about 90%, by weight of the substrate. In a particular aspect, the substrate contains between about 10% and about 30%, by weight, thermoplastic fibers.

Generally, a nonwoven substrate will have a basis weight in the range of about 17 gsm (grams per square meter) to about 200 gsm, more typically, between about 33 gsm to about 200 gsm. The actual basis weight can be higher than 200 gsm, but for many applications, the basis weight will be in the 33 gsm to 150 gsm range.

The thermoplastic materials or fibers, making-up at least a portion of the substrate, can essentially be any thermoplastic polymer. Suitable thermoplastic polymers include polyolefins, polyesters, polyamides, polyurethanes, polyvinylchloride, polytetrafluoroethylene, polystyrene, polyethylene terephthalate, biodegradable polymers such as polylactic acid, and copolymers and blends thereof. Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene, and blends thereof; polybutylene, e.g., poly(1-butene) and poly(2-butene); polypentene, e.g., poly(1-pentene) and poly(2-pentene); poly(3-methyl-1-pentene); poly(4-methyl 1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, polytrimethylene terephthalate, polybutylene terephthalate, polytetramethylene terephthalate, polycyclohexylene-1,4-dimethylene terephthalate, and isophthalate copolymers thereof, as well as blends thereof. These thermoplastic polymers can be used to prepare both substantially continuous fibers and staple fibers, in accordance with the present disclosure.

In another aspect, the substrate can be a tissue product. The tissue product can be of a homogenous or multi-layered construction, and tissue products made therefrom can be of a single-ply or multi-ply construction. The tissue product desirably has a basis weight of about 10 g/m² to about 65 g/m², and density of about 0.6 g/cc or less. More desirably, the basis weight will be about 40 g/m² or less and the density will be about 0.3 g/cc or less. Most desirably, the density will be about 0.04 g/cc to about 0.2 g/cc. Unless otherwise specified, all amounts and weights relative to the paper are on a dry basis. Tensile strengths in the machine direction can be in the range of from about 100 to about 5,000 grams per inch of width. Tensile strengths in the cross-machine direction are from about 50 grams to about 2,500 grams per inch of width. Absorbency is typically from about 5 grams of water per gram of fiber to about 9 grams of water per gram of fiber.

Conventionally pressed tissue products and methods for making such products are well known in the art. Tissue products are typically made by depositing a papermaking furnish on a foraminous forming wire, often referred to in the art as a Fourdrinier wire. Once the furnish is deposited on the forming wire, it is referred to as a web. The web is dewatered by pressing the web and drying at elevated temperature. The particular techniques and typical equipment for making webs according to the process just described are well known to those skilled in the art. In a typical process, a low consistency pulp furnish is provided from a pressurized headbox, which has an opening for delivering a thin deposit of pulp furnish onto the Fourdrinier wire to form a wet web. The web is then typically dewatered to a fiber consistency of from about 7% to about 25% (total web weight basis) by vacuum dewatering and further dried by pressing operations wherein the web is subjected to pressure developed by opposing mechanical members, for example, cylindrical rolls. The dewatered web is then further pressed and dried by a steam drum apparatus known in the art as a Yankee dryer. Pressure can be developed at the Yankee dryer by mechanical means such as an opposing cylindrical drum pressing against the web. Multiple Yankee dryer drums can be employed, whereby additional pressing is optionally incurred between the drums. The formed sheets are considered to be compacted because the entire web is subjected to substantial mechanical compressional forces while the fibers are moist and are then dried while in a compressed state.

One particular aspect of the present disclosure utilizes an uncreped through-air-drying technique to form the tissue product. Through-air-drying can increase the bulk and softness of the web. Examples of such a technique are disclosed in U.S. Pat. No. 5,048,589 to Cook, et al.; U.S. Pat. No. 5,399,412 to Sudall, et al.; U.S. Pat. No. 5,510,001 to Hermans, et al.; U.S. Pat. No. 5,591,309 to Ruqowski, et al.; U.S. Pat. No. 6,017,417 to Wendt, et al., and U.S. Pat. No. 6,432,270 to Liu, et al. Uncreped through-air-drying generally involves the steps of: (1) forming a furnish of cellulosic fibers, water, and optionally, other additives; (2) depositing the furnish on a traveling foraminous belt, thereby forming a fibrous web on top of the traveling foraminous belt; (3) subjecting the fibrous web to through-air-drying to remove the water from the fibrous web; and (4) removing the dried fibrous web from the traveling foraminous belt.

Conventional scalable methods, such as spraying, can be used to apply a superhydrophobic coating on a surface. Some technical difficulties are typically encountered when spraying water-based dispersions: The first major problem is insufficient evaporation of the fluid during atomization and a high degree of wetting of the dispersion onto the coated substrate, both resulting in non-uniform coatings due to contact line pinning and the so called “coffee-stain effect” when the water eventually evaporates. The second major challenge is the relatively large surface tension of water when compared with other solvents used for spray coating. Water, due to its high surface tension, tends to form non-uniform films in spray applications, thus requiring great care to ensure that a uniform coating is attained. This is especially critical for hydrophobic substrates where the water tends to bead and roll. It was observed that the best approach for applying the aqueous dispersions of the present disclosure was to produce extremely fine droplets during atomization, and to apply only very thin coatings, so as not to saturate the substrate and re-orient hydrogen bonding within the substrate that, after drying, would cause cellulosic substrates (e.g. paper towel) to become stiff.

In another aspect, the coatings are spray cast first on a substrate, such as standard paperboard or other cellulosic substrate; multiple spray passes are used to achieve different coating thicknesses. The sprayed films are then subjected to drying in an oven at about 80° C. for about 30 min to remove all excess water. Once dried, the coatings are characterized for wettability (i.e., hydrophobic vs. hydrophilic). The substrates can be weighed on a microbalance (Sartorius® LE26P) before and after coating and drying in order to determine the minimum level of coating required to induce superhydrophobicity. This “minimum coating” does not strictly mean that the sample will resist penetration by liquids, but rather that a water droplet will bead on the surface and roll off unimpeded. Liquid repellency of substrates before and after coating can be characterized by a hydrostatic pressure setup that determines liquid penetration pressures (in cm of liquid).

EXAMPLES

The following are provided for exemplary purposes to facilitate understanding of the disclosure and should not be construed to limit the disclosure to the examples.

Materials

Titanium (IV) oxide ($TiO_2$) nanoparticles (anatase, rutile, and a mixture of rutile and anatase) were obtained from Sigma-Aldrich. The polyolefin (PE) blend dispersion consisting of polyethylene-acrylic acid copolymer (~40%) to stabilize the dispersion and polyethylene-octene copolymer H60%), was obtained from DOW Chemical (42 wt % in water; HYPOD 8510). Deionized water was used as a probe liquid for contact and roll-off angle measurements.

Procedure

To prepare the sprayable dispersions, the following procedure was developed. Solids content in any sprayable dispersion is a critical component, too little of which requires unnecessary additional coatings and a wasteful expenditure of water, too much of which can cause high viscosities and/or clogging thus making spray atomization untenable. A solids content of 5 wt. % in water was settled upon as high enough for adequate coating deposition per spray pass, and well below the solids content where spray problems are encountered (>10-15 wt. %). The solids content is then divided into a nanoparticle-to-polymer ratio to evaluate the effect of increased particle content. Ratios tested were 0:100, 25:75, 50:50, 60:40, 75:25, 80:20, and 85:15. Ratios below, and including, the 50:50 particle-to-polymer composition did not possess adequate roughness to achieve a high degree of repellency due to the PE blend being only weakly hydrophobic, but are included and characterized to show the evolution in increased water contact angles as a function of roughness from the smooth untextured all-polymer coating (0:100). The limit of particle content was set at 85:15, above which the polymer content is reduced to such a low level that particle adhesion is severely compromised. To prepare a 20 g dispersion in a 50:50 ratio as an example, 0.5 g $TiO_2$ is initially weighed out into a 20 mL vial. Subsequently, 18.3 g of deionized water is added to the dry particles and probe-sonicated for 1 minute. Since the as-received polymer blend is 42 wt. % in water, the portion of water from the polymer suspension is subtracted from the initial water balance added; the water content in the final dispersion will be 95 wt. % after the next and final step. After probe-sonication, 1.19 g of PE polymer (42 wt. % solids=0.5 g PE, 50:50 $TiO_2$:PE) suspension is added to the dispersion and then mechanically mixed using a stir-bar for 5 minutes. An airbrush atomizer (Paasche, VL siphon feed, 0.55 mm spray nozzle) was used to spray onto glass slides from a distance of 20 cm. Water-based spray dispersions pose several challenges as the formation of necessary roughness features in the composite is inhibited by the slow evaporation of the water. To this end, the small spray nozzle was selected for finer spray atomization to enhance water evaporation during application. Spray distance can affect morphology and deposition, and was chosen to avoid excessive water accumulation during each spray pass from being too close, and to maximize coating deposition that can be reduced at greater distances. Between spray passes, a hand dryer was used to evaporate residual water in the composite. Care was taken to ensure spray uniformity and control over coating thickness. To determine coating weight and verify uniformity, glass slides were weighed before and after the coating process to determine coating weight in gsm.

Coating Characterization

Three glass slides were sprayed for each ratio tested, all of which were characterized for water droplet contact/sliding angles to form a more accurate average incorporating uncertainties in the spray parameters. In determining contact angles (CA) hysteresis, water droplets were syringe-dispensed and similarly withdrawn using a 1 mm needle-tip such that probe droplet diameters ranged from 1 mm to 4 mm size. This facilitates dynamic measurement of advancing and receding contact angles. For sliding angles, the glass slides were placed on a goniometer operated by a small VXM motor allowing precise control through small angle increments until a 10 μL water droplet was seen to roll from its initial position on the level glass slide. If the droplets did not roll, the coated substrates were deemed "sticky."

For SEM observations, a small area (roughly 0.25 $cm^2$) was cut from coated aluminum foil. Aluminum foil was used in place of glass slides for its conductivity to facilitate electron microscopy, but prepared in the exact same manner. The prepared samples were then sputter-coated with a 5 nm Pt—Pd coating to facilitate SEM imaging.

Results and Discussion

The crystalline differences between anatase and rutile phases of $TiO_2$ are well understood; however, the adsorption mechanisms on the metal oxide surfaces, and their phase transitions have been the source of some controversy and lack of consensus in the literature. Aggregation of these nanoparticles into larger clusters is directly dependent on the phase, in turn sensitive to particle dimensions, temperature, and pH. In general, smaller nano$TiO_2$ particles are more reactive based on the ratio of dissociative to molecular adsorption. Transmission electron microscopy (TEM) was employed to analyze the $TiO_2$ nanoparticles of each form; shown in FIGS. 1A and 1B are representative samples of both the 21 nm mixed-phase and anatase particles, respectively. Particles of the 21 nm $TiO_2$ mixed blend were found to be ~21 nm in diameter as expected, yet readily tend toward agglomeration through surface charging mechanisms (i.e., hydrogenation). Even in vacuum, water adsorption is likely retained on the surface of these particles, and may be contributing to the observed aggregation in the mixed-phase particles due to the presence of the rutile phase. The anatase $TiO_2$ had a lower tendency for agglomeration explained by a lower surface energy over that of rutile. The anatase particles were easily isolated in TEM vacuum for imaging, and observed to be <60 nm diameter in particle size; they were larger compared to their as-purchased quoted size of <25 nm, a common discrepancy in large-scale batch-processing of nanoparticles.

The greater density of the anatase, attributed to the larger particle size, was evident by how quickly the particles settled when placed in an aqueous suspension, as shown in FIG. 2. The photograph was taken one month after both types of $TiO_2$ were probe-sonicated in water at 5 wt. % concentration, and allowed to settle. The minute dimensions of the 21 nm mixed-phase allowed these particles to remain suspended indefinitely with some slight settling due to a statistical unavoidable presence of larger particles and agglomerates; whereas, the anatase sedimented phase was observed to be much more dense, occupying a smaller volume into the vial as compared to the mixed-phase and, not surprisingly, settling much more rapidly.

After suspending the nanoparticles in water and fully dispersing through sonication, the PE polymer was added; the dispersion was then sprayed onto foil for SEM imaging. FIGS. 3A to 3F show SEM imaging of the three types of $TiO_2$ tested in a 75:25 mass ratio of nanoparticle to polymer; anatase in FIGS. 3A and 3B, 21 nm mixed-phase in FIGS. 3C and 3D, and the 100 nm mixed-phase in FIGS. 3E and 3F. The FIGS. 3A/3C/3E row and the FIGS. 3B/3D/3F row refer to lower and greater magnification, respectively (note the 50 μm and 5 μm scale-bars). Surprisingly, the anatase form is seen to aggregate larger features in the final composite as compared to the other two. This is surprising due to the fact that, typically, the anatase isolated much easier amongst neighboring particles when placed in aqueous suspension. Evidently, the addition of the polymer allows for greater particle clumping in the final dispersion as compared to the mixed-phases. The anatase was also seen to be unstable in the final dispersion, settling much faster attributed to its higher density. For the 21 nm mixed-phase composite, the polymer acts as a stabilizing agent preventing excessive agglomeration. The final dispersion for the 21 nm mixed-phase was observed to only separate slightly after one week when allowed to rest, forming a thin layer of water on the top of the vial but easily returning to a stable suspension state when shaken; performance of the final composite after spraying was not noticeably affected.

The larger agglomerate sizes, or surface features of the composite, have a direct impact on droplet mobility in the final composite. The large clumps of anatase particles and exposed polymer can be observed in FIGS. 3A and 3B. Referring to FIG. 3B, the individual $TiO_2$ aggregates can be seen dotting the polymer surface. The unit size of these agglomerates matches well with the observed unit size in the other coatings and are all uniformly of submicron (<1 μm) dimensions; yet, for the anatase, these unit agglomerates further condense into much larger clumps, some approaching 50 μm in size (FIG. 3A), during spray-casting. These hierarchical roughness features are not entirely undesirable and can aid in generating super-repellency; unfortunately, the weakly hydrophobic smooth patches of exposed polymer can detract from droplet mobility resulting in 'sticky' patches on the surface where droplets can adhere and pin due to the roughness contrast. In contrast, the submicron agglomerates in the case of the 21 nm mixed-phase remain constant during spray-casting, forming extremely uniform nanometer-scale roughness along the surface. The patches of smooth exposed PE seem to be well absorbed by the nanoparticles, and lack the smooth regions of polymer observed for the anatase. The 100 nm mixed-phase composite has typical particle dimensions closer to 100 nm as opposed to the 20 nm range, yet the unit agglomerate sizes match very well with the other two despite the order of magnitude difference. The composite more closely resembles the 21 nm mixed-phase coating as expected. Yet, the 100 nm mixed-phase composite appears to inadequately allow the PE to cover the nanoparticle lumps fully, likely due to particle size, similar to the all-anatase composite; small regions of smooth exposed polymer seen in the close-up (grey patches in FIG. 3F). The composite forms a unique blend of features observed in the two isolated composite images, incorporating aspects of both with a larger range of aggregate sizes with intermittent small patches of smooth polymer.

Dynamic contact angles were measured for all coatings on glass slides in order to better understand the role of particle size, type, and polymer coverage. For any superhydrophobic surface, the sessile contact angle is generally considered limited for understanding how mobile droplets are expected to be when introduced to the surface. An advancing and receding contact angle is more appropriate when attempting to characterize a self-cleaning surface, wherein droplet mobility is important for transporting surface contaminants away. The difference in advancing and receding CA is known as CA hysteresis and is ideally, as close to zero as possible for best performance in regards to self-cleaning and therefore, super-repellency.

Figure 4A:
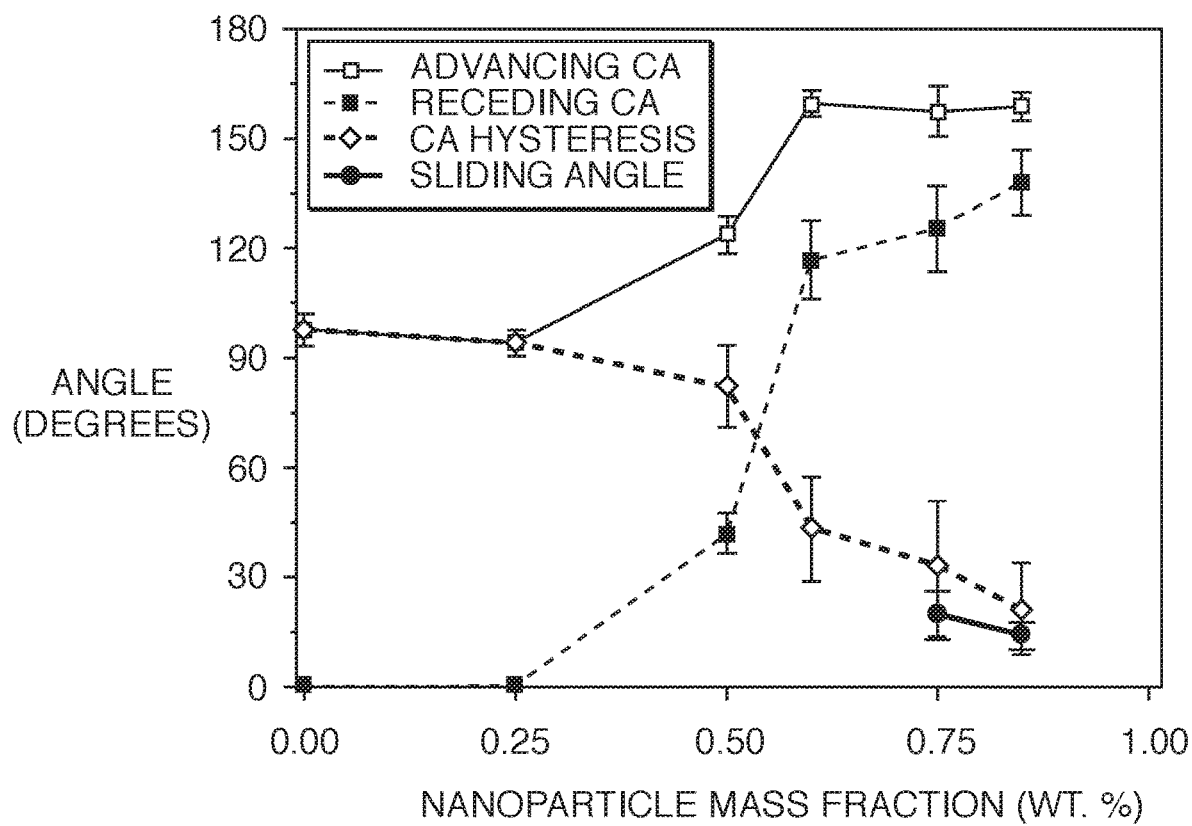
FIG. 4A illustrates the behavior (in terms of contact angle) of water droplets introduced to the surfaces of the anatase $TiO_2$ composites possessing a range of nanoparticle loadings for determining optimal ratios.
Figure 4B:
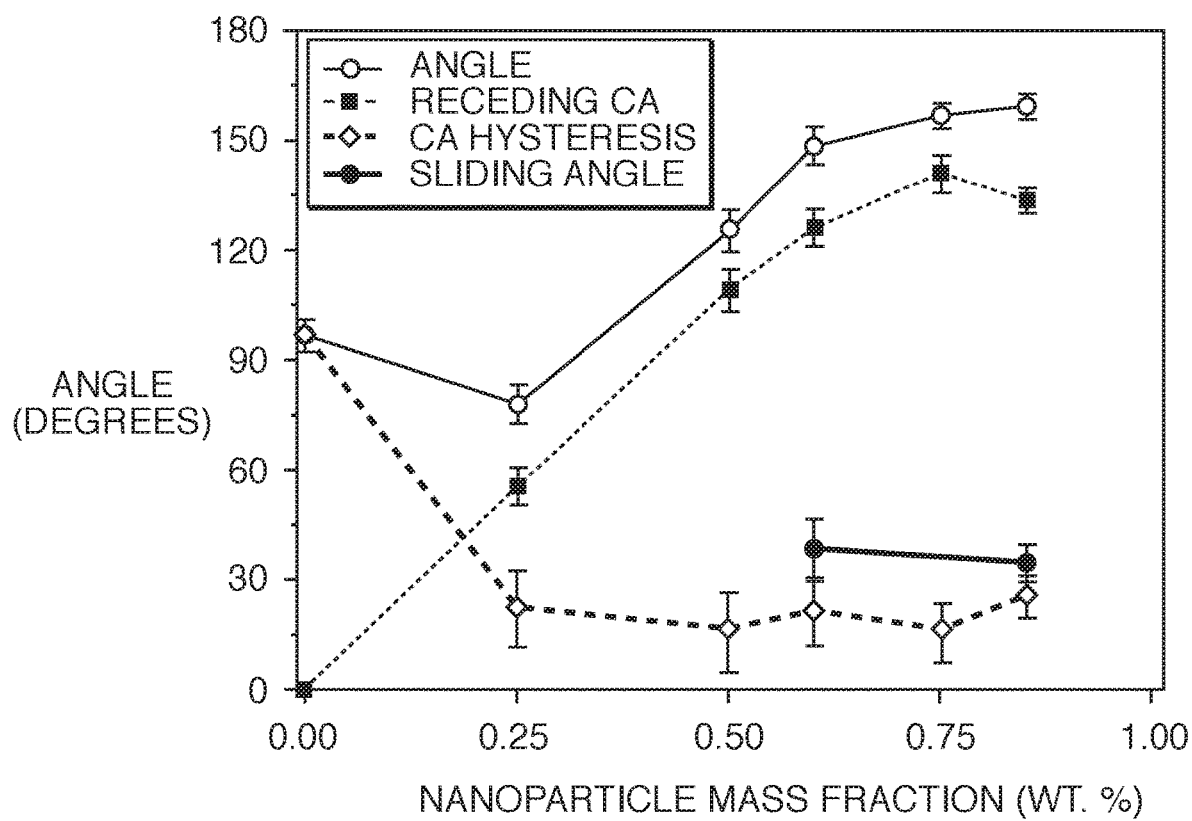
FIG. 4B illustrates the behavior (in terms of contact angle) of water droplets introduced to the surfaces of the mixed-phase $TiO_2$ composites possessing a range of nanoparticle loadings for determining optimal ratios.
Figure 4C:
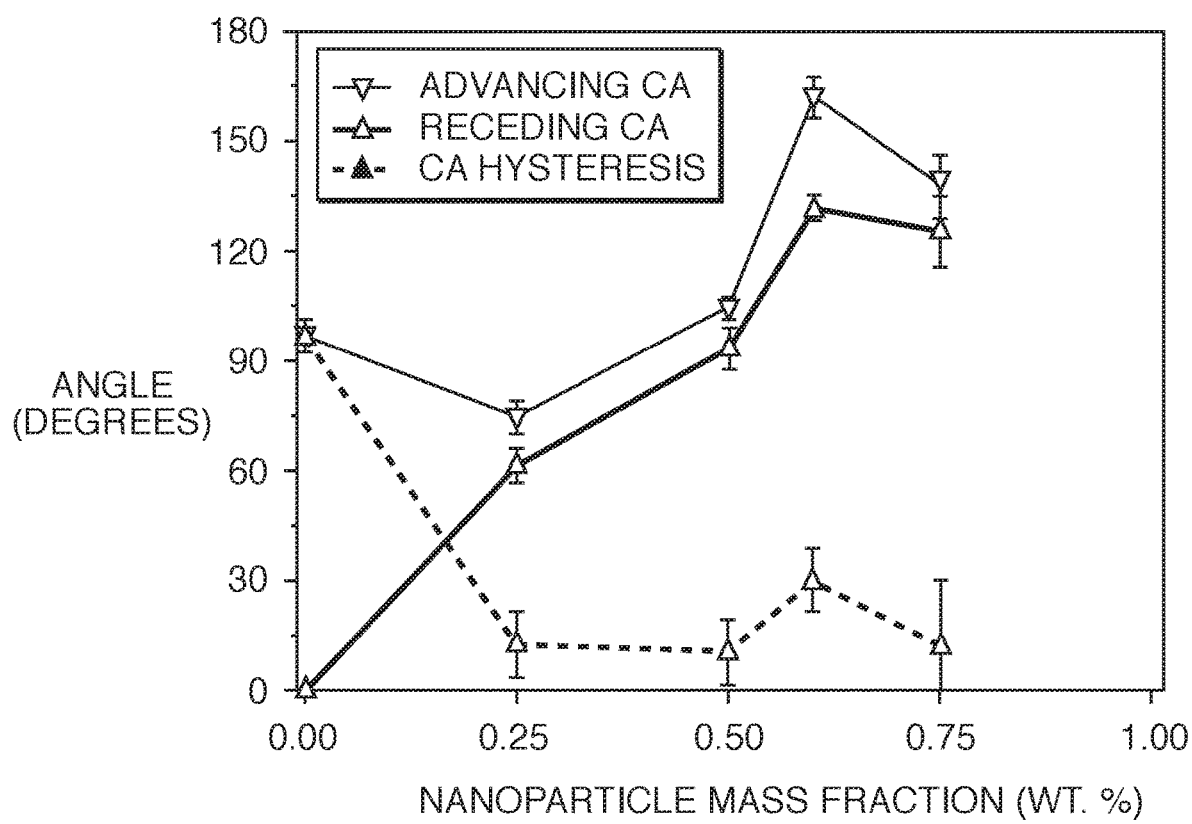
FIG. 4C illustrates the behavior (in terms of contact angle) of water droplets introduced to the surfaces of the mixed anatase and rutile $TiO_2$ composites possessing a range of nanoparticle loadings for determining optimal ratios.

FIGS. 4A to 4C illustrate the behavior of water droplets introduced to the surfaces of the composites possessing a range of nanoparticle loadings for determining optimal ratios. FIGS. 4A to 4C include dynamic wettability measurements for all three types of $TiO_2$ tested for all nanoparticle mass fractions. For all three $TiO_2$ samples, the increase in mass fraction above 50 wt. % boosts advancing contact angle (green) to above 150° while also decreasing the contact angle hysteresis (blue, defined as the advancing minus the receding contact angle shown in red). The green line in each plot represents the advancing CA, as opposed to the red for receding CA. The lessening CA hysteresis, or difference between advancing and receding CA, is a metric for higher performance, as advancing and receding CA angles become more aligned; this correlates to a decrease in adhesion of water droplets to the surface, in turn facilitating droplet mobility. The CA of ~95° for pure PE polymer (i.e., 0:100 ratio, no roughness) is shown as the y-intercept for all three plots; of note is the zero receding CA for the all-PE coating; the polymer itself is extremely sticky to water droplets and only weakly hydrophobic. As nanoparticle loading is increased, all three composites achieve higher advancing contact angles as well as a reduction in CA hysteresis; the receding angle approaches that of the advancing angle. CA hysteresis for the mixed-phase composites diminishes much more rapidly at increased particle loading, mainly due to the reduction is exposed polymer as discussed for FIGS. 3A to 3F and the greater prevalence of nano-roughness. The exposed patches of polymer in the anatase coating allow for regions on the surface for the droplet to anchor, thus pinning the receding contact line and preventing it from receding. The hybridized regions of nanotextured and smooth polymer in the mixture composite produces small variations in projected performance as the particle loading increases, compared to the steady and repeatable increase in performance for the rutile case.

In terms of overall dispersion stability and performance, the 21 nm mixed-phase $TiO_2$ composite was the more uniform and repeatable superhydrophobic coating. The suspension could be maintained indefinitely making it ideal for large-area industrial-scale surface treatments, without risk of the formulation going out of suspension avoiding creating wasteful expenditures and poor efficiencies. All three composites were shown to achieve superhydrophobicity above a 60:40 ratio; however, reducing particle content severely inhibits nanoparticle adhesion above a 75:25 ratio. It is shown there is a desirable composite blend of nanoparticle to polymer ratio between 60 and 75 wt. % nanoparticles loading to achieve superhydrophobicity.

Figure 5:
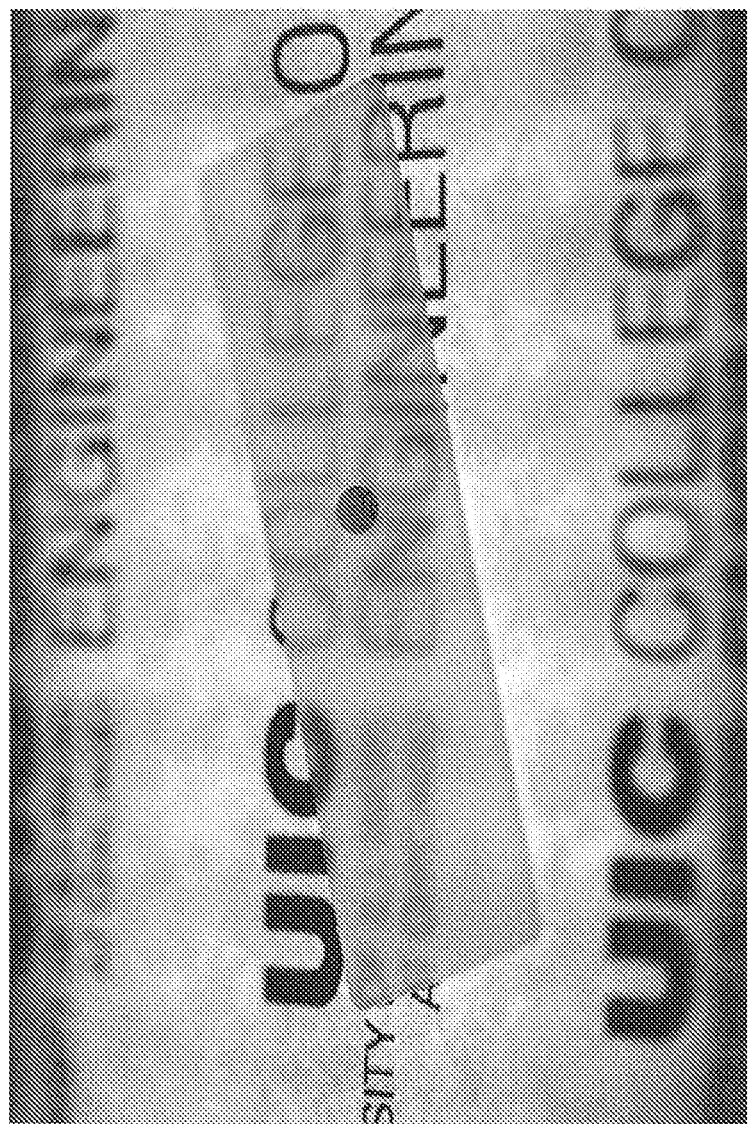
FIG. 5 illustrates the translucent-white nature of the coating on a glass slide where the University of Illinois at Chicago (UIC) Engineering logo is visible beneath the coated slide, and where the coating is shown to induce water droplet beading (water is dyed for visualization) characteristic of superhydrophobic coatings.

A stable, entirely water-based and non-fluorinated spray dispersion is shown in FIG. 5 to achieve a translucent-white superhydrophobic composite coating applicable for large-area surface treatments. Composed of $TiO_2$ and a waterborne wax polyolefin polymer, the ideal ratios of the formulation moieties were determined by dynamic contact angle measurements emphasizing the reduction in contact angle hysteresis to target droplet mobility as a critical performance requirement. Analysis of SEM and TEM images allowed for a better understanding of hydrophilic $TiO_2$ nanoparticle phase variants and the impact of particle size on coating performance. The anatase was observed to resist the formation of aggregates when suspended in water, whereas the 21 nm mixed-phase quickly formed particle groupings most likely due to the presence of surface charges on the rutile particles. This surface charging explains the uniformity of the spray-cast 21 nm mixed-phase composites when combined with the alkaline polymer blend, such polar interactions serve to more completely sheath the hydrophilic particles in a hydrophobic polymer shell. The anatase on the other hand, being more intrinsically inert, will form greater agglomerate sizes due to the slightly charged free polymer strands seeking equilibrium by decreasing the volume-to-surface-area ratio in the composite. Thus, the incorporation of a unique waterborne polymer blend is shown to be effective in low environmental-impact superhydrophobic composites achieved through tuning of nanometer scale roughness of hydrophilic titanium oxide.

In a first particular aspect, a superhydrophobic non-fluorinated composition includes a hydrophobic matrix component free of fluorine; hydrophilic filler particles, wherein the filler particles are metal oxide nanoparticles; and water, wherein the hydrophobic component is in an aqueous dispersion.

A second particular aspect includes the first particular aspect, wherein the metal oxide nanoparticle is titanium dioxide.

A third particular aspect includes the first and/or second aspect, wherein the metal oxide nanoparticle is rutile titanium dioxide, anatase titanium dioxide, or a mixture of rutile and anatase titanium dioxide.

A fourth particular aspect includes one or more of aspects 1-3, wherein the metal oxide nanoparticle is mixed-phase titanium dioxide.

A fifth particular aspect includes one or more of aspects 1-4, wherein the mixed-phase titanium dioxide has an average particle size of 21 nm.

A sixth particular aspect includes one or more of aspects 1-5, wherein the filler particle is configured to form a protective bond with the hydrophobic component.

A seventh particular aspect includes one or more of aspects 1-6, wherein the ratio of the filler particle to the hydrophobic component is at least 1.

An eighth particular aspect includes one or more of aspects 1-7, wherein the hydrophobic component is a polymer.

A ninth particular aspect includes one or more of aspects 1-8, wherein the hydrophobic component includes a polyolefin.

A tenth particular aspect includes one or more of aspects 1-9, wherein the hydrophobic component includes a copolymer of olefin and acrylic acid.

An eleventh particular aspect includes one or more of aspects 1-10, wherein the composition is free of volatile organic compounds.

A twelfth particular aspect includes one or more of aspects 1-11, wherein the composition is configured to be dispersed by a spray.

In a thirteenth particular aspect, a superhydrophobic non-fluorinated composition includes a hydrophobic polymer free of fluorine; a titanium dioxide nanoparticle filler particle; and water.

A fourteenth particular aspect includes the thirteenth particular aspect, wherein the hydrophobic polymer includes a polyolefin.

A fifteenth particular aspect includes the thirteenth and/or fourteenth aspect, wherein the titanium dioxide nanoparticle is rutile titanium dioxide, anatase titanium dioxide, or a mixture of rutile and anatase titanium dioxide.

A sixteenth particular aspect includes one or more of aspects 13-15, wherein the titanium dioxide nanoparticle is mixed-phase titanium dioxide.

An seventeenth particular aspect includes one or more of aspects 13-16, wherein the mixed-phase titanium dioxide has an average particle size of 21 nm.

In an eighteenth particular aspect, a superhydrophobic non-fluorinated composition includes a hydrophobic polymer free of fluorine, wherein the hydrophobic polymer includes a polyolefin; titanium dioxide nanoparticles as filler, wherein the titanium dioxide nanoparticles are rutile titanium dioxide, anatase titanium dioxide, or a mixture of rutile and anatase titanium dioxide; and water.

A nineteenth particular aspect includes the eighteenth particular aspect, wherein the titanium dioxide nanoparticle is mixed-phase titanium dioxide.

A twentieth particular aspect includes the eighteenth and/or nineteenth aspect, wherein the mixed-phase titanium dioxide has an average particle size of 21 nm.

All documents cited herein are, in relevant part, incorporated herein by reference; the citation of any document is not to be construed as an admission that it is prior art with respect to the present disclosure. To the extent that any meaning or definition of a term in this document conflicts with any meaning or definition of the same term in a document incorporated by reference, the meaning or definition assigned to that term in this document shall govern.

While particular aspects of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A superhydrophobic non-fluorinated composition consisting essentially of:
    a hydrophobic matrix component free of fluorine;
    hydrophilic filler particles, wherein the hydrophilic filler particles are nanoparticles comprising titanium dioxide, rutile titanium dioxide, anatase titanium dioxide, or a mixture of rutile and anatase titanium dioxide or a mixed-phase titanium dioxide; and
    water, wherein the hydrophobic component is in an aqueous dispersion.
2. The superhydrophobic composition of claim 1, wherein the mixed-phase titanium dioxide has an average particle size of 21 nm.
3. The superhydrophobic composition of claim 1, wherein the filler particle is configured to form a protective bond with the hydrophobic component.
4. The superhydrophobic composition of claim 1, wherein the ratio of the filler particle to the hydrophobic component is at least 1.
5. The superhydrophobic composition of claim 1, wherein the hydrophobic component is a polymer.
6. The superhydrophobic composition of claim 1, wherein the hydrophobic component includes a polyolefin.
7. The superhydrophobic composition of claim 1, wherein the hydrophobic component includes a co-polymer of olefin and acrylic acid.
8. The superhydrophobic composition of claim 1, wherein the composition is free of volatile organic compounds.
9. The superhydrophobic composition of claim 1, wherein the composition is configured to be dispersed by a spray.
10. A superhydrophobic non-fluorinated composition comprising:
    a hydrophobic polymer free of fluorine;
    a titanium dioxide nanoparticle filler particle; and
    water.
11. The superhydrophobic composition of claim 10, wherein the hydrophobic polymer includes a polyolefin.
12. The superhydrophobic composition of claim 10, wherein the titanium dioxide nanoparticle is rutile titanium dioxide, anatase titanium dioxide, or a mixture of rutile and anatase titanium dioxide.
13. The superhydrophobic composition of claim 10, wherein the titanium dioxide nanoparticle is mixed-phase titanium dioxide.
14. The superhydrophobic composition of claim 13, wherein the mixed-phase titanium dioxide has an average particle size of 21 nm.
15. A superhydrophobic non-fluorinated composition comprising:
    a hydrophobic polymer free of fluorine, wherein the hydrophobic polymer includes a polyolefin;
    titanium dioxide nanoparticles as filler, wherein the titanium dioxide nanoparticles are rutile titanium dioxide, anatase titanium dioxide, or a mixture of rutile and anatase titanium dioxide; and
    water.
16. The superhydrophobic composition of claim 15, wherein the titanium dioxide nanoparticle is mixed-phase titanium dioxide.
17. The superhydrophobic composition of claim 16, wherein the mixed-phase titanium dioxide has an average particle size of 21 nm.

* * * * *